United States Patent
Lee

(10) Patent No.: US 10,767,075 B2
(45) Date of Patent: Sep. 8, 2020

(54) COATING COMPOSITION COMPRISING NANO-SOL, AND PREPARATION METHOD THEREOF

(71) Applicant: NANOSHIELD TECHNOLOGY CO., LTD, Taipei (TW)

(72) Inventor: James Cheng Lee, La Habra, CA (US)

(73) Assignee: Nanoshield Technology Co., Ltd., Taipei (TW)

( * ) Notice: Subject to any disclaimer, the term of this patent is extended or adjusted under 35 U.S.C. 154(b) by 129 days.

(21) Appl. No.: 16/115,110

(22) Filed: Aug. 28, 2018

(65) Prior Publication Data

US 2019/0085201 A1    Mar. 21, 2019

Related U.S. Application Data

(60) Provisional application No. 62/558,877, filed on Sep. 15, 2017.

(51) Int. Cl.

| | | |
|---|---|---|
| *C09D 167/07* | (2006.01) | |
| *C09D 7/62* | (2018.01) | |
| *H01B 3/42* | (2006.01) | |
| *C09D 167/08* | (2006.01) | |
| *C09D 5/00* | (2006.01) | |
| *C09D 7/40* | (2018.01) | |
| *C09D 7/63* | (2018.01) | |
| *C08K 3/22* | (2006.01) | |
| *C08K 5/01* | (2006.01) | |
| *C08K 3/36* | (2006.01) | |
| *C08K 5/56* | (2006.01) | |
| *C08K 5/00* | (2006.01) | |
| *C08K 5/057* | (2006.01) | |

(52) U.S. Cl.
CPC .......... *C09D 167/07* (2013.01); *C09D 5/00* (2013.01); *C09D 7/62* (2018.01); *C09D 7/63* (2018.01); *C09D 7/67* (2018.01); *C09D 167/08* (2013.01); *H01B 3/425* (2013.01); *C08K 3/22* (2013.01); *C08K 3/36* (2013.01); *C08K 5/0025* (2013.01); *C08K 5/01* (2013.01); *C08K 5/057* (2013.01); *C08K 5/56* (2013.01); *C08K 2003/2227* (2013.01); *C08K 2003/2237* (2013.01)

(58) Field of Classification Search
CPC .............................. C09D 7/67; C09D 167/08
See application file for complete search history.

(56) References Cited

U.S. PATENT DOCUMENTS

| | | | | |
|---|---|---|---|---|
| 2002/0173384 A1* | 11/2002 | Hogge | ............... | A63B 37/0003 473/378 |
| 2005/0025991 A1* | 2/2005 | Ishizuka | .................. | B05D 7/51 428/626 |
| 2010/0272991 A1* | 10/2010 | Park | ....................... | C09D 5/084 428/341 |

FOREIGN PATENT DOCUMENTS

CN             106117582 A    * 11/2016

OTHER PUBLICATIONS

Machine translation of CN-106117582-A. (Year: 2016).*

* cited by examiner

*Primary Examiner* — Wenwen Cai
(74) *Attorney, Agent, or Firm* — Duane Morris LLP

(57) ABSTRACT

A coating composition for forming an electrically insulating film, a method of making the coating composition, and the cured coating composition are provided. The coating composition includes a curable polymer comprising at least one functional group for forming cross-linking structures, a curative configured to react with the at least one functional group in the curable polymer, a sol comprising silica or metal oxide nanoparticles having a particle diameter in a range of from about 0.1 nm to about 100 nm, an organic titanate, and optionally at least one solvent or diluent. The resulting cured coating or paint provides good insulation, coverage, adhesion, toughness, and corrosion resistance.

23 Claims, 1 Drawing Sheet

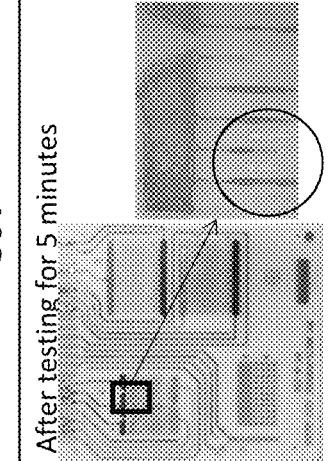

COATING COMPOSITION COMPRISING NANO-SOL, AND PREPARATION METHOD THEREOF

PRIORITY CLAIM AND CROSS-REFERENCE

This application claims the benefit of U.S. Provisional Application No. 62/558,877, filed Sep. 15, 2017, which application is expressly incorporated by reference herein in its entirety.

FIELD OF THE INVENTION

The disclosure relates to coating generally. More particularly, the disclosed subject matter relates to a varnish or insulating coating composition, a method of making and a method of using the same.

BACKGROUND

An insulating coating or varnish can be applied to semiconductor or electronic devices. For example, an insulating film can be applied for insulating interlayer films in semiconductors, and insulating interlayer films of multi-layer circuits. Such an insulating coating or varnish needs to exhibit good electrical, thermal and mechanical properties, a low permittivity, and a high corrosion resistance.

As electronic devices continue to shrink in size and grow in capacity, the importance of corrosion control increases. Miniaturization of systems based on integrated circuits and small size electronic components, close component spacing, separable electrical contacts having lower voltages and contact force than before have resulted in failures of electrical components because of the formation of small quantities of metal corrosion. Therefore, it is important to find a method for fabricating electronic devices with a good insulating coating. This technique can protect the device surface from being corroded and moistened by some exterior chemicals, and extend the operating life of the device.

In addition, some other engineering systems such as aircraft, automobiles, pipelines, and naval vessels also need a protective film providing good electrical insulation and keeping them from being corroded.

SUMMARY OF THE INVENTION

The present disclosure provides a coating composition for forming an electrically insulating film, a method of making the coating composition, and the cured coating composition. The present disclosure also provides a method of using a nano sol comprising nanoparticles in a coating or varnish formulation.

The coating composition includes a curable polymer comprising at least one functional group for forming cross-linking structures, a curative configured to react with the at least one functional group in the curable polymer, a sol comprising silica or metal oxide nanoparticles having a particle diameter in a range of from about 0.1 nm to about 100 nm, an organic titanate, and optionally at least one solvent or diluent.

In some embodiments, based on a total weight of the coating composition, the curable polymer is present in a range of from about 40% to about 95% by weight, the curative is present in a range of from about 0.5% to about 5% by weight, the sol is present in a range of from about 0.5% to about 30% by weight, the organic titanate is present in a range of from about 0.5% to about 10% by weight, and the at least one solvent or diluent is present in a range of from about 20% to about 70%.

The curable polymer can be of any suitable type. In some embodiments, the curable polymer is an alkyd resin. For example, the alkyd resin may be vinyl or acrylic modified. The at least one functional group include vinyl or acrylic (or acrylate) functional group. In some embodiments, the curable polymer is a vinyl-toluene modified alkyd resin, in which the at least one functional group includes vinyl groups. The at least one functional group may also include hydroxyl groups. The hydroxyl groups in the polymer may react and crosslink with the hydroxyl group on the surface of nanoparticles.

The curative may be any suitable curative or co-agent for curing the polymer. For example, the curative may include vinyl or allyl groups. For example, the curative is vinyl toluene in some embodiments.

In some embodiments, the sol comprises about 0.3% to about 20% by weight of silica or metal oxide nanoparticles based on the weight of the sol. The sol may contain any suitable solvent such as water, alcohol, any other organic solvents, or any combination thereof. Examples of nanoparticles in the sol include, but are not limited to, silicon oxide, titanium oxide, aluminum oxide, and any combination thereof. For example, in some embodiments, the sol comprises about 0.3% to about 5% by weight of silicon dioxide nanoparticle by the weight of the sol, and the silicon oxide nanoparticles have a particle diameter in a range of about 0.1 nm to about 10 nm.

The organic titanate, which catalyzes the curing of the composition and also improves coating adhesion onto a substrate, may be an organic alkoxy titanate in some embodiments. Examples of a suitable organic titanate include, but are not limited to, butyl titanate, ethyl titanate, isopropyl titanate, or any combination thereof.

Examples of a suitable solvent or diluent include, but are not limited to, N-methyl pyrrolidone (NMP), naphtha, dearomatized hydrocarbon, or any combination thereof. In some embodiments, the at least solvent or diluent includes propylene glycol methyl ether acetate.

In another aspect, the present disclosure also provides a method of making the coating composition as described. Such a method include comprising in one or more steps mixing a curable polymer comprising at least one functional group for forming cross-linking structures, a curative configured to react with the at least one functional group in the curable polymer, and optionally at least one solvent or diluent, with a sol comprising silica or metal oxide nanoparticles having a particle diameter in a range of from about 0.1 nm to about 100 nm, and an organic titanate. The present disclosure provides a method of using the sol and/or the organic titanate in a coating composition or varnish.

All the descriptions or combinations thereof related to the coating composition also apply to the method. For example, in some embodiments, the curable polymer is a vinyl or acrylic modified alkyd resin. The at least one functional group further includes hydroxyl group for reacting with the nanoparticles. In some embodiments, the sol comprises about 0.3% to about 5% by weight of silicon dioxide or any other suitable nanoparticles based on the weight of the sol, and the nanoparticles have a particle diameter in a range of from about 0.1 nm to about 100 nm, for example, in a range of about 0.1 nm to about 10 nm.

For another example, the organic titanate is butyl titanate, ethyl titanate, isopropyl titanate, or any combination thereof in some embodiments. The at least solvent or diluent includes N-methyl pyrrolidone (NMP), naphtha, dearomatized hydrocarbon, propylene glycol methyl ether acetate, or any combination thereof.

In another aspect, the present disclosure also provides a resulting cured coating derived from the coating composition as described. The coating composition may be cured under any suitable condition such as heating. The cured coating composition comprises a crosslinked polymer derived from a curable polymer, a cured curative derived from the curative, silica or metal oxide nanoparticles, and a derivative of the organic titanate. The crosslinked polymer and the cured curatives are crosslinked together. In some embodiments, a crosslinked polymer is further crosslinked with silica or metal oxide nanoparticles, for example, through the hydroxyl groups.

In some embodiments, wherein based on the total weight of the cured coating composition, the crosslinked polymer is present in a range of from about 70% to about 98.5%, the cured curative is present in a range of from about 0.5% to about 5%, the silica or metal oxide nanoparticles are present in a range of from about 0.5% to about 15%, and the derivative of the organic titanate is present in a range of from about 0.5% to about 10%.

The descriptions or combinations thereof related to the coating composition also apply to the cured coating composition. For example, the crosslinked polymer is alkyd resin based, and the nanoparticles are silicon dioxide in some embodiments.

The coating composition can be applied onto any substrate such as printed circuit board assemblies (PCBA), semiconductor devices, electronic devices, and some other engineering systems such as aircraft, automobiles, pipelines, and naval vessels. The resulting cured coating or paint provides good insulation, coverage, toughness, and adhesion. The cured coating or paint has excellent resistance to corrosion.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

FIG. 1 summarizes the testing results of IPC boards including the controls without coating and the working samples with the coating in accordance with some embodiments after electric testing at different voltages in 3.6 wt. % salt aqueous solution.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure the singular forms "a," "an," and "the" include the plural reference, and reference to a particular numerical value includes at least that particular value, unless the context clearly indicates otherwise. Thus, for example, a reference to "a printed circuit board assembly (PCBA)" is a reference to one or more of such structures and equivalents thereof known to those skilled in the art, and so forth. Furthermore, when a sentence is recited "at least one of A, B and C", it can be interpreted to mean that any combination. For example, may be only "A", or "B", or "C", or "A and B", or "A and C", or "B and C", or "A and B and C."

When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive; as another example, the phrase "about 8%" preferably (but not always) refers to a value of 7.2% to 8.8%, inclusive. Where present, all ranges are inclusive and combinable.

For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

All the elements and features described herein can be combined, unless expressly indicated otherwise. Even though each dependent claim may be written to depend from one claim only, the features of the elements and the features in the dependent claims can be combined. For a group of claims under one independent claim, each dependent claim can be rewritten to depend on any of the preceding claims in the same group.

In the present disclosure, unless expressly indicated otherwise, the temperature values are in Celsius scale. The percentages in the formulations are in weight percent (wt. %).

The present disclosure provides a coating composition for forming an electrically insulating film, a method of making the coating composition, and the cured coating composition. The present disclosure also provides a method of adding or using a nano sol comprising nanoparticles in a coating or varnish formulation.

The coating composition includes a curative polymer (resin), a curative, a sol comprising nanoparticles, an organic titanate, and optionally at least one solvent or diluent.

Curable Polymer:

The curable polymer comprises at least one functional group for forming cross-linking structures. The curable polymer can be of any suitable type including, but not limited to, alkyd resin, epoxy, polyurethane, acrylate, urethane acrylate, and silicone. In some embodiments, the curable polymer is an alkyd resin. For example, the alkyd resin may be vinyl or acrylic modified. The at least one functional group include vinyl or acrylic (or acrylate) functional group. In some embodiments, the curable polymer is a vinyl-toluene modified alkyd resin, in which the at least one functional group includes vinyl groups. An alkyd resin may be a polyester based polymer made from polyol and polybasic acid or anhydrides thereof. The at least one functional group may also include hydroxyl groups. The hydroxyl groups in the polymer may react and crosslink with the hydroxyl groups on the surface of nanoparticles and derivatives of the organic titanate.

Vinyl-toluene modified alkyd resins are available from suppliers such as Deltech Corporation of Baton Rouge, La., USA. Vinylation can be performed before, during, or after a reaction between a polyol and a polybasic acid.

Curative:

The coating composition may comprise a curative for facilitating the curing of the polymer. The curative can be also called a co-agent or a crosslinking agent. The curative may react with the at least one functional group in the curable polymer. In some embodiments, the curative or co-agent may be optional, and the coating composition may not contain any curative or co-agent.

The curative may be any suitable chemical for curing the polymer. For example, the curative may include vinyl or allyl groups. For example, the curative is vinyl toluene in some embodiments.

Nano Sol:

A sol used comprises silica or metal oxide nanoparticles. For example, the nanoparticle may have a particle diameter in a range of from about 0.1 nm to about 100 nm. Examples of nanoparticles in the sol include, but are not limited to, silicon oxide, titanium oxide, aluminum oxide, any other metal oxide, and any combination thereof.

In some embodiments, the sol comprises about 0.3% to about 20% by weight of silica or metal oxide nanoparticles based on the weight of the sol. The sol may contain any suitable solvent such as water, alcohol, any other organic solvents, or any combination thereof.

In some embodiments, the silicon dioxide nanoparticle sol or solution includes a mixture of the silicon dioxide nanoparticles and a solvent. The method for preparing the silicon dioxide nanoparticle sol or solution includes steps of: adding silica powders and distilled water into a serum bottle; adjusting the pH value of the mixed solution in the range of 6.5-9.5 by adding one or more of, acidic solvents such as $HNO_3$, HF, $H_2SO_4$ or HCl, organic solvents such as isopropyl alcohol (IPA), acetone or alcohol, and alkaline solvents such as NaOH, KOH, or $NH_4OH$; and adding organic solvents such as n-hexane, n-heptane, n-octane, n-dodecane, n-tetradecane, or n-hexadecane into the mixed solution. The method for silicon dioxide nanoparticle sol or solution further includes adding the metallic materials such as Fe, Cr, Mn, or Mo as the catalysts into the mixed solution; and heating the mixed solution under vigorous stirring at an appropriate temperature and time, for example, at about 50° C. to 150° C. for 1-10 hours forming a two-layer mixed solution where smaller-scale silicon dioxide nanoparticles existing in the top-layer mixed sol or solution. The top layer of the mixed sol or solution is extracted.

This silicon dioxide nanoparticle sol or solution has a concentration, for example, in the range from 0.3% to 20% (e.g., 0.3% to 5%) by weight of silicon dioxide nanoparticle based on the weight of the sol or solution. The silicon dioxide sol or solution includes silicon dioxide nanoparticles having a size or a size distribution in the range of from 1 angstrom to tens of nanometers, such as 0.1 nm to 50 nm at room temperature. For example, the silicon oxide nanoparticles have a particle diameter in a range of about 0.1 nm to about 10 nm.

In the preparation of the sol or solution, an acid and a basic solution may be added to neutralize with each other and adjust pH value. If an acid is added first, and the pH is in the acidic range after reaction, an alkaline solution may be added to neutralize the acid in excess. If the solution is too basic, an acidic solution may be added to neutralize the base in excess.

In some embodiments, the nanoparticles may be silica particles, which are amorphous and hydrophobic. The silica particles (e.g., fumed silica) are obtained from a supplier, without any chemical modification. These particles provide desirable hydrophobicity in a coated surface. The silica particles may be chemically modified in some other embodiments. Silica particles used may have some hydroxyl (—OH) groups on the surface. These hydroxyl groups may react with a hydroxyl group on a surface of a substrate, other metal oxide nanoparticles, the curable polymer, and/or the derivative of the organic titanate, and promote formation of covalent bonds to improve coating adhesion and mechanical properties such as toughness of the coating. The nanoparticles have high reactivity of nanomaterials, and makes the coating composition crosslink fast. Addition of the nanoparticles in the coating or varnish reduces bubble generation in the coating process resulting in pores, and increases its electrically insulating properties.

In some embodiments, the solvent composition includes heptane, cetane, methyl hydrogen siloxane, the like or any combination thereof. For example, in some embodiments, the solvent includes about 70-90 wt. % (e.g., 78.6 wt. %) of heptane, 4.9-25 wt. % (e.g., 20.8 wt. %) of cetane, and methyl hydrogen siloxane. An exemplary methyl hydrogen siloxane has the following formula:

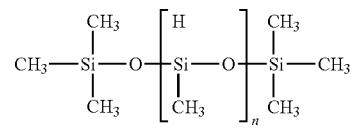

where n is in a range of 1-10 (e.g., 2-8, 2-6, 2-4, or any suitable number). The percentage of hydrogen from —SiH in methyl hydrogen siloxane may be in the range of from about 0.5 wt. % to 2.0 wt. %.

The catalyst assists the surface modification of silica particles, in which some hydroxyl groups on the hydrophilic silica in the aqueous phase is grafted with organic molecules such as methyl hydrogen siloxane. The modified silica particles migrate from the aqueous phase to the organic solvent phase. In some embodiments, the silicon dioxide nanoparticle sol or solution is transparent, hydrophobic, and low volatile. In some other embodiments, the second solvent comprises amino modified siloxane or amino modified silane. Such amino modified siloxane or silane may optionally comprise —OH groups or may react with water or moisture to generate —OH groups.

In some embodiments, the metal oxide nanoparticle sol or solution includes a mixture of the metal oxide nanoparticles and a solvent. The method for preparing the metal oxide nanoparticle sol solution includes steps of: adding metal powders and distilled water into a serum bottle; adjusting the pH value of the mixed solution in the range of 6.5-9.5 by adding one or more of, acidic solvents such as $HNO_3$, HF, $H_2SO_4$ or HCl, neutral solvents such as IPA, acetone or alcohol, and alkaline solvents such as NaOH, KOH, or $NH_4OH$. The method for preparing the metal oxide nanoparticle sol or solution may further include heating the mixed solution under vigorous stirring at an appropriate temperature for a period of time, for example, at about 50° C. to 150° C. for 10-20 hours to produce the metal oxide nanoparticle solution. In some embodiments, metal powders and distilled water may be mixed at a ratio in the range from 0.1:100 to 5:100, for example, 1:100 by weight.

An acid and a basic solution are added to neutralize with each other and adjust pH values. If an acid is added first, and the pH is in the acidic range after reaction, an alkaline solution may be added to neutralize the acid in excess. If the solution is too basic, an acidic solution may be added to neutralize the base in excess. The metal oxide nanoparticle sol or solution has a concentration, for example, in the range from 0.3% to 5% by weight. The metal oxide nanoparticle solution has metal oxide nanoparticles having a size or a size distribution in the range of several to hundreds of nanometers, such as about 5 nm to about 100 nm, at room temperature. The solvent may be selected from one of water, methanol, ethanol, and the like or any combination thereof. In some embodiments, the metal oxide nanoparticle solution is hydrophilic and transparent.

Unless expressly indicated otherwise, references to "metal oxide" made herein will be understood to encompass any suitable oxide of any suitable metal. Examples of suitable metal oxides include, but are not limited to, the oxides of a metal (or a combination thereof) selected from the following groups: (1) Al, Ga, In, Sn, Tl, Pb, and Bi ("poor metals"); (2) the first series of transition metals (first d block series) including Sc, Ti, V, Cr, Mn, Fe, Co, Ni, Cu, and Zn; (3) the second series of transition metals (second d block series) including Y, Zr, Nb, Mo, Tc, Ru, Rh, Pd, Ag, and Cd; and (4) the third series of transition metals (third d block series) including Lu, Hf, Ta, W, Re, Os, Ir, Pt, and Au. More preferably, the metal for the metal oxides is selected from at least one of Al, Ti, Mn, Co, Zn, Mo, Rh, Pd, Ag, W, Au and any combination thereof. For example, a suitable metal oxide is titanium dioxide $TiO_2$ or alumina in some embodiments.

In the sol containing nanoparticles, a surfactant or dispersant may be used in some embodiments.

Organic Titanate:

An organic titanate can be used to catalyze the curing of the composition and also improve coating adhesion onto a substrate. Such a titanate may be an organic alkoxy titanate in some embodiments. Examples of a suitable organic titanate include, but are not limited to, butyl titanate (titanium butoxide), ethyl titanate, isopropyl titanate, or any combination thereof. The chemical names of such an organic titanate include, but are not limited to, tetra n-butyl titanate, tetra isopropyl titanate, tetra 2-ethylhexyl titanate, isopropyl butyl titanate, and tetra ethyl titanate. The organic titanate can hydrolyze to form derivatives such as titanium oxide or titanium-containing organic substance, which may have hydroxyl groups.

Organic titanate can be available from suppliers, for example, under tradename TYZOR™ from Dorf Ketal Chemicals (I) Pvt. Ltd. of Mumbai, India.

Solvent or Diluent:

At least one solvent or diluent may be optionally added into the curable polymer or the final formulation to adjust viscosity for good flowability and easy application.

Examples of a suitable solvent or diluent include, but are not limited to, N-methyl pyrrolidone (NMP), naphtha, dearomatized hydrocarbon, the like or any combination thereof. Dearomatized hydrocarbon solvent or oil can be available under tradename EXXSOL™ from ExxonMobil Company.

In some embodiments, propylene glycol methyl ether acetate (PGMEA, 1-methoxy-2-propanol acetate) is added to increase flowability and coverage of the coating composition. Propylene glycol methyl ether acetate is also a fast evaporating hydrophobic glycol ether. PGMEA is available under the tradename DOWANOL™ PMA from the Dow Chemical Company, or under the name of methyl proxitol acetate from Shell Chemical Company.

Formulation:

In some embodiments, based on a total weight of the coating composition, the curable polymer is present in a range of from about 40% to about 95%, for example, in a range of 40%-80%, 40%-60%, or 60-80%.

Based on a total weight of the coating composition, the curative may be present in a range of from about 0.5% to about 5% by weight, for example, 3%-5%.

Based on a total weight of the coating composition, the sol may be present in a range of from about 0.5% to about 30% by weight, for example, 0.5%-15%, 0.5%-10%, 0.5%-5%, or 0.5%-3%.

Based on a total weight of the coating composition, the organic titanate is present in a range of from about 0.5% to about 10% by weight, for example, 0.5%-5% or 2%-5%.

Based on a total weight of the coating composition, the at least one solvent or diluent is present in a range of from about 10% to about 70%, for example, 15%-40%, 20%-70%, 20%-60%, 20%-60% or 30%-60%. The content is solvent or diluent can be adjust to provide a desired viscosity. A diluent can be the same as a solvent. Propylene glycol methyl ether acetate (PGMEA) may be in a range of from about 5% to about 10%.

The total percentage in sum of the ingredients in the coating composition is adjusted to be 100%.

The coating composition may or may not contain an initiator such as an organic peroxide. In some embodiments, the coating composition does not include any initiator. The formulation in accordance with some embodiments advantageously dry and cure fast at a low temperature such as room temperature without using an initiator.

The coating composition can be made as one-part or two-part composition. In a two-part composition, a first part can include the curable polymer, the curative and solvents. The second part can include nano sol, organic titanate, and optionally diluent or solvent. The two-part formulation may be cured at room temperature or other low temperatures.

In some embodiments, the curable coating composition comprises a vinyl-toluene modified alkyd resin, in which the at least one functional group includes both vinyl groups and hydroxyl groups. The vinyl groups will form crosslinks among polymer chains, and also with a curative such as vinyl toluene if such a curative is used. The hydroxyl groups in the polymer may react and crosslink with the hydroxyl group on the surface of nanoparticles such as silicon oxide particles in the sol and titanium containing derivative such as titanium oxide resulting from the organic titanate used.

In another aspect, the present disclosure also provides a method of making and using the coating composition as described. The present disclosure provides a method of using or adding the sol and/or the organic titanate in a coating composition or varnish to improve insulating properties, mechanical properties such as toughness, solvent resistance, water resistance, corrosion resistance, and ultraviolet light resistance. The ingredients can be mixed in any order.

For example, such a method includes comprising in one or more steps mixing a curable polymer comprising at least one functional group for forming cross-linking structures, a curative configured to react with the at least one functional group in the curable polymer, and optionally at least one solvent or diluent, with a sol comprising silica or metal oxide nanoparticles having a particle diameter in a range of from about 0.1 nm to about 100 nm, and an organic titanate.

All the descriptions or combinations thereof related to the coating composition also apply to the method. For example, in some embodiments, the curable polymer is a vinyl or acrylic modified alkyd resin. The at least one functional group further includes hydroxyl group for reacting with the nanoparticles. In some embodiments, the sol comprises about 0.3% to about 5% by weight of silicon dioxide or any other suitable nanoparticles based on the weight of the sol, and the nanoparticles have a particle diameter in a range of from about 0.1 nm to about 100 nm, for example, in a range of about 0.1 nm to about 10 nm.

For another example, the organic titanate is butyl titanate, ethyl titanate, isopropyl titanate, or any combination thereof in some embodiments. The at least solvent or diluent includes N-methyl pyrrolidone (NMP), naphtha, dearomatized hydrocarbon, propylene glycol methyl ether acetate, or any combination thereof.

The coating composition described herein can be applied onto a substrate of a device to form a coating or nanofilm thereon. The device may be of any suitable type. The coating composition can be applied onto any substrate such as printed circuit board assemblies (PCBA), semiconductor devices, electronic devices, some other engineering systems such as aircraft, automobiles, pipelines, and naval vessels. The coating composition can be applied by any suitable coating technique including, but not limited to, brushing, spraying, and dipping.

The coating may have a thickness in micrometer or nanometer level. For example, a thickness of nanofilm coating is less than 500 nm in some embodiments. For example, the coating thickness may be in the range of from 5 nm to 500 nm, from 10 nm to 100 nm, or in other suitable ranges depending on usage of electronic devices.

The coating composition can be dried and cured (cross-linked) under any suitable conditions, for example, under heating conditions in a temperature. The curing temperature may be in a range of from 25° C. to 150° C., for example, from 50° C. to 100° C., or from 50° C. to 80° C.

In another aspect, the present disclosure also provides a resulting cured coating derived from the coating composition as described. The cured coating composition comprises a crosslinked polymer derived from a curable polymer, a cured curative derived from the curative, silica or metal oxide nanoparticles, and a derivative of the organic titanate. The crosslinked polymer and the cured curatives are cross-linked together. In some embodiments, a crosslinked polymer is further crosslinked with silica or metal oxide nanoparticles and the titanate, for example, through the hydroxyl groups.

In some embodiments, wherein based on the total weight of the cured coating composition, the crosslinked polymer is present in a range of from about 70% to about 98.5% (e.g., 60%-80%), the cured curative is present in a range of from about 0.5% to about 5% (e.g., 3%-5%), the silica or metal oxide nanoparticles are present in a range of from about 0.5% to about 15% (e.g., 0.5%-5%), and the derivative of the organic titanate is present in a range of from about 0.5% to about 10% (e.g., 0.5%-5%, or 2%-5%). The total percentage in sum of the ingredients in the coating composition is 100%.

The descriptions or combinations thereof related to the coating composition also apply to the cured coating composition. For example, the crosslinked polymer is alkyd resin based, and the nanoparticles are silicon dioxide in some embodiments.

In a cured coating, the polymer chains crosslink together with each other and with the curative. The polymer chains, nanoparticles, and organic titanate also promote formation of covalent bonds at the interfaces through chemical reactions of hydroxyl groups. For example, in some embodiments, the nanoparticles may have residue hydroxyl groups. Silicon dioxide nanoparticles may also comprise methyl hydrogen siloxane grafted on the surface. When moisture or water (such as warm or hot water) is introduced, chemical group —Si—H is converted into —Si—OH, which will react with —OH on the polymer to form —O—Si—O— bonds, and react with titanate to form interfacial —Si—O—Ti— bonds.

The resulting cured coating or paint provides good insulation, coverage, toughness, and adhesion. The cured coating or paint has excellent resistance to water, solvent, corrosion, and ultraviolet light.

Examples

Experiments were conducted as follows. A first varnish solution is provided and used. The first varnish solution included a vinyl-toluene modified alkyd resin, vinyl toluene as a curative, and one or more solvents. The solvents included N-methyl pyrrolidone (NMP), naphtha, and dearomatized hydrocarbon. The first varnish solution included about 40-60 wt. % of the vinyl-toluene modified alkyd resin, about 3-5 wt. % of vinyl toluene, about 10-20 wt. % of N-methyl pyrrolidone (NMP), about 10-20 wt. % of naphtha, and about 10-20 wt. % of dearomatized hydrocarbon. The solvents were in a range of about 35-57% in total.

A nano sol comprising 0.5-3 wt. % of silicon dioxide nanoparticles was prepared. A solvent used in the sol included about 70-90 wt. % (e.g., 78.6 wt. %) of heptane, 4.9-25 wt. % (e.g., 20.8 wt. %) of cetane, and methyl hydrogen siloxane. The silicon oxide nanoparticles had a particle diameter in a range of about 0.1 nm to about 10 nm.

The first varnish solution, the nano sol, butyl titanate, a diluent (the same as the solvent in the first varnish solution), and PGMEA were then mixed together based on the following ratios to provide a coating composition:

| | |
|---|---|
| First varnish solution | 60%-80%; |
| Diluent | 15%-20%; |
| PGMEA | 5%-10%; |
| Butyl titanate | 2%-5%; and |
| Nano sol | 0.5%-3%. |

The diluent and the PGMEA were 12%-37.5% in total. No peroxide or other initiator was used in the curable coating composition.

The curable coating composition was coated onto printed circuit boards such as IPC (integrated printed circuit) boards, and cured at 25° C. for 15 minutes and baked at 60° C. for 8 hours.

The coating working samples were compared to the samples without coating, and the samples coated with a commercial product, 3M™ NOVEC™ electronic coating EGC-1700, which is a clear, low viscosity solution of a fluorochemical acrylate polymer coating in a hydrofluoroether solvent.

Coating adhesion was evaluated by using the known 100-grid (cross hatch) method. A cross-hatch cutter (front angle 15°/30°) was used to cut 100 squares. A tape (600 or 610 type from 3M) was quickly pulled at 180° within 30-90 seconds from a coating sample. Two species for each working example were tested. A luminescent magnifying glass was used to check how much paint falls off the substrate or a preceding layer. Based on the criteria, paint stripping-off should be less than 15% based on the area. All the working examples passed this adhesion test, with no significant stripping/peeling-off of coating. As comparison, most of general insulating coatings without using nano sol become hard and brittle after cured and may fall off or peel off.

The dielectric strength of the coating samples was measured according to ASTM D115. The dielectric strength data were in a range of 3300-3400 v/mil for dry coatings, and in a range of 2300-2500 v/mil for wet coating after immersed in water.

The bonding strength of the coating samples was measured according to ASTM D2519 (MW35). The bonding strength result was as high as 106.8 Newtons (24 lbs) at 25° C., and 14.7 Newtons (3.3 lbs) at 100° C.

Electrical testing of IPC boards without coating (the controls) and with the coating composition (the working examples) was conducted with immersion in salt water solution. The solution contained 3.6% salt by weight in tap water. For consistency, a sea salt solution of "Instant Ocean" brand was used. The samples were immersed in the salt solution, and tested at 4 volts or 18 volts for one hour, or at 30 volts in 2.5-second pulse with 5 pulses. The pulse was repeated up to one hour. Based on IPC 6012C, Qualification and Performance Specification for Rigid Printed Boards, the minimum resistance during moisture or water exposure is 100 mega ohms for Class 2 electronics. Hence the maximum allowed output current for an input voltage of 4 V, 8 V, and 30 V is 0.04 µA, 0.18 µA, and 0.3 µA, respectively. After the testing, no corrosion is allowed. Observed corrosion indicates that a corresponding sample fails the testing.

FIG. 1 summarizes the testing results of IPC boards including the controls without coating and the working samples with the coating in accordance with some embodiments after electric testing at different voltages in the salt aqueous solution. For each sample, FIG. 1 shows an image of the printed board and a corresponding magnified view of the conductive pad (pointed by the arrows). As shown in FIG. 1, the control samples without coating showed significant corrosion (marked with circles) and failed within 5 minutes of the immersion electrical testing at each of 4 V, 18V and 30 V. As comparison, the working samples with the coating in accordance with some embodiments showed normal pads without corrosion after at least one-hour electrical testing in such a salt water solution.

Table 1 shows the results of measured maximum output current for electrical leakage during the electrical testing with immersion in salt water solution as described above. As shown in Table 1, the controls without coating failed very quickly due to severe corrosion, and the controls coated with the commercial product, which is a fluorinated acrylate polymer coating, also failed the leakage test due to corrosion. The working examples with the coating in accordance with some embodiments passed the test with measured leakage current much lower than the thresholds according to the specification.

TABLE 1

| Input Voltage & Spec. | Controls without insulation coating | Controls coated with the Commercial Product | Working Examples with coating |
|---|---|---|---|
| 4 V Spec. <0.04 uA | >3A (Instantaneous short circuit) | 0.4 mA | 0.00018 uA |
| 18 V Spec. <0.18 uA | >3A (Instantaneous short circuit) | 1.4 mA | 0.00194 uA |
| 30 V Spec. <0.3 uA | >3A (Instantaneous short circuit) | 5.97 mA | 0.00234 uA |
| Visual inspection (4 V, 18 V, 30 V) | Serious corrosion of circuit lines | Partial lines with black spots/ corrosion | Normal |
| Test result | Fail | Fail | PASS |

Instead of the IPC boards, electronic products such a battery or battery pack were used to conduct the same experiments of coating and electrical testing with immersion in the salt water solution. The battery samples with solder joints (connectors) were uncoated, coated with the commercial product, and coated with the coating provided in the present disclosure, respectively. The connectors were coupled with the positive and negative terminals, respectively. Each battery sample was also connected with a headset PCBA for playing music. For each sample, three pieces of specimen were tested. In the first test, the batteries were immersed in the salt water solution. A battery sample was dipped into the salt water solution for 30 minutes in total. In a second test, 0.5 mL of salt water solution was dripped onto the connectors once within one hour. The dripping was performed for 6 cycles up to 6 hours. The testing results are summarized in Table 2.

TABLE 2

| Samples | Results |
|---|---|
| Controls with No coating | Solder joints & electrical function failed Power on/dipped for 4 minutes then failed. (Auto power off/solder joints became black) |
| Controls coated with 3M-EGC-1700 (Commercial Product) | Solder joints & electrical function failed Power on/dipped for 12 minutes then failed (Auto power off/solder joins became black) |
| Working Examples with coating | PASS Power on/dipped for 30 minutes later and still worked normally The coated battery successfully reached to 30 minute of dipping in 3.6% NaCl solution and also passed saline dripping test up to 6 hours |

The resulting coatings also have good biocompatibility and is environmentally friendly.

Although the subject matter has been described in terms of exemplary embodiments, it is not limited thereto. Rather, the appended claims should be construed broadly, to include other variants and embodiments, which may be made by those skilled in the art.

What is claimed is:

1. A coating composition, comprising:
   a curable polymer comprising at least one functional group for forming cross-linking structures;
   a curative configured to react with the at least one functional group in the curable polymer, wherein the curable polymer is a vinyl or acrylic modified alkyd resin;
   a sol comprising silica or metal oxide nanoparticles having a particle diameter in a range of from about 0.1 nm to about 100 nm;
   an organic titanate; and
   optionally at least one solvent or diluent.

2. The coating composition of claim 1, wherein based on a total weight of the coating composition,
   the curable polymer is present in a range of from about 40% to about 95%;
   the curative is present in a range of from about 0.5% to about 5%;
   the sol is present in a range of from about 0.5% to about 30%;
   the organic titanate is present in a range of from about 0.5% to about 10%; and
   the at least one solvent or diluent is present in a range of from about 10% to about 70%.

3. The coating composition of claim 1, wherein the curable polymer is a vinyl-toluene modified alkyd resin and the at least one functional group includes vinyl and hydroxyl groups.

4. The coating composition of claim 1, wherein the curative includes vinyl or allyl groups.

5. The coating composition of claim 1, wherein the curative is vinyl toluene.

6. The coating composition of claim 1, wherein the sol comprises about 0.3% to about 20% by weight of silica or metal oxide nanoparticles based on the weight of the sol.

7. The coating composition of claim 1, wherein the sol comprises nanoparticles selected from the group consisting of silicon oxide, titanium oxide, aluminum oxide, and any combination thereof.

8. The coating composition of claim 1, wherein the sol comprises about 0.3% to about 5% by weight of silicon dioxide nanoparticle by the weight of the sol, the silicon oxide nanoparticles having a particle diameter in a range of about 0.1 nm to about 10 nm.

9. The coating composition of claim 1, wherein the organic titanate is an organic alkoxy titanate.

10. The coating composition of claim 1, wherein the organic titanate is butyl titanate, ethyl titanate, isopropyl titanate, or any combination thereof.

11. The coating composition of claim 1, wherein the at least solvent or diluent includes N-methyl pyrrolidone (NMP), naphtha, dearomatized hydrocarbon, or any combination thereof.

12. The coating composition of claim 1, wherein the at least solvent or diluent includes propylene glycol methyl ether acetate.

13. A method of making a coating composition, comprising in one or more steps mixing
   a curable polymer comprising at least one functional group for forming cross-linking structures, a curative configured to react with the at least one functional group in the curable polymer, and optionally at least one solvent or diluent, with
   a sol comprising silica or metal oxide nanoparticles having a particle diameter in a range of from about 0.1 nm to about 100 nm; and an organic titanate,
   wherein the curable polymer is a vinyl or acrylic modified alkyd resin.

14. The method of claim 13, wherein the at least one functional group further includes hydroxyl group for reacting with the nanoparticles.

15. The method of claim 13, wherein the sol comprises about 0.3% to about 5% by weight of silicon dioxide nanoparticles based on the weight of the sol, the silicon oxide nanoparticles having a particle diameter in a range of about 0.1 nm to about 10 nm.

16. The method of claim 15, wherein the organic titanate is butyl titanate, ethyl titanate, isopropyl titanate, or any combination thereof.

17. The method of claim 15, wherein the at least solvent or diluent includes N-methyl pyrrolidone (NMP), naphtha, dearomatized hydrocarbon, propylene glycol methyl ether acetate, or any combination thereof.

18. A cured coating composition derived from the coating composition of claim 1, comprising:
   a crosslinked polymer derived from the curable polymer, a cured curative derived from the curative, silica or metal oxide nanoparticles, and a derivative of the organic titanate,
   wherein the crosslinked polymer and the cured curatives are crosslinked together.

19. The cured coating composition of claim 18, wherein the crosslinked polymer is further crosslinked with silica or metal oxide nanoparticles.

20. The cured coating composition of claim 18, wherein based on the total weight of the cured coating composition
   the crosslinked polymer is present in a range of from about 70% to about 98.5%,
   the cured curative is present in a range of from about 0.5% to about 5%,
   the silica or metal oxide nanoparticles are present in a range of from about 0.5% to about 15%, and
   the derivative of the organic titanate is present in a range of from about 0.5% to about 10%.

21. The cured coating composition of claim 18, wherein the nanoparticles are silicon dioxide.

22. A coating composition, comprising:
   a curable polymer comprising at least one functional group for forming cross-linking structures;
   a curative configured to react with the at least one functional group in the curable polymer;
   a sol, wherein the sol comprises about 0.3% to about 5% by weight of silicon dioxide nanoparticle by the weight of the sol, the silicon oxide nanoparticles having a particle diameter in a range of about 0.1 nm to about 10 nm;
   an organic titanate; and
   optionally at least one solvent or diluent.

23. The coating composition of claim 22, wherein the organic titanate is an organic alkoxy titanate.

* * * * *